United States Patent
Burr et al.

(10) Patent No.: US 9,176,974 B1
(45) Date of Patent: Nov. 3, 2015

(54) LOW PRIORITY, MULTI-PASS, SERVER FILE DISCOVERY AND MANAGEMENT

(71) Applicant: Sprint Communications Company L.P., Overland Park, KS (US)

(72) Inventors: Jonathon A. Burr, Overland Park, KS (US); John D. Felton, Leawood, KS (US); Keith A. Trotter, Lenexa, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 338 days.

(21) Appl. No.: 13/744,825

(22) Filed: Jan. 18, 2013

(51) Int. Cl.
*G06F 17/30* (2006.01)

(52) U.S. Cl.
CPC .... *G06F 17/30144* (2013.01); *G06F 17/30289* (2013.01)

(58) Field of Classification Search
None
See application file for complete search history.

(56) References Cited

U.S. PATENT DOCUMENTS

| | | | |
|---|---|---|---|
| 7,856,664 | B2 | 12/2010 | De Gaetano |
| 8,312,423 | B1 | 11/2012 | Webb et al. |
| 8,452,712 | B2 | 5/2013 | Garst et al. |
| 9,047,161 | B1 | 6/2015 | Burr et al. |
| 2001/0011254 | A1 | 8/2001 | Clark |
| 2002/0152194 | A1* | 10/2002 | Sathyanarayan ............ 707/1 |
| 2003/0182563 | A1 | 9/2003 | Liu et al. |
| 2005/0289072 | A1 | 12/2005 | Sabharwal |
| 2006/0021067 | A1 | 1/2006 | Jindal et al. |
| 2012/0089971 | A1 | 4/2012 | Williams et al. |
| 2012/0311564 | A1 | 12/2012 | Khalid |
| 2014/0033315 | A1 | 1/2014 | Biswas et al. |
| 2014/0115672 | A1 | 4/2014 | Wood et al. |
| 2014/0137261 | A1 | 5/2014 | Chen et al. |

OTHER PUBLICATIONS

Sripal, "Pipe output to use as the search specification for grep on Linux," http://stackoverflow.com/questions/437504/pipe-output-to-use-as-the-search-specification-for-grep-on-linux, answer, Jun. 2012.*

Girouard, "How to exclude a list of full directory paths in find command on Solaris," http://stackoverflow.com/questions/7854975/how-to-exclude-a-list-of-full-directory-paths-in-find-command-on-solaris, Oct. 2011.*

Unix manual page for find command from archive.org, https://web.archive.org/web/20090228141550/http://unixhelp.ed.ac.uk/CGI/man-cgi?find, Feb. 2009.*

FAIPP Pre-Interview Communication dated Oct. 21, 2014, U.S. Appl. No. 13/743,238, filed Jan. 16, 2013.

Notice of Allowance dated Jan. 26, 2015, U.S. Appl. No. 13/743,238, filed Jan. 16, 2013.

Burr, Jonathon A., et al., entitled, "Discovery, Consolidation, and Archival of Multiple Operating System Software Licenses," filed Jan. 16, 2013, U.S. Appl. No. 13/743,238.

* cited by examiner

*Primary Examiner* — Jay Morrison

(57) ABSTRACT

A devices and method for scanning a file directory on a server system by identifying and excluding at least one file directory that contains files detrimental to the system's performance to form a group of remaining directories, scanning the group of remaining directories to discover files by comparing the files to a first parameter and a second parameter, discovering the most related files and outputting the discovered files location.

20 Claims, 4 Drawing Sheets

LOW PRIORITY, MULTI-PASS, SERVER FILE DISCOVERY AND MANAGEMENT

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Communications networks are operated and controlled by software stored on components of the network, such as servers. The increasing consumer demands for increased access and data transmission through the network has resulted in the specialization of software. Consequently, additional software installations are utilized to meet the demands of customers and result in storage directories for the software installations and related files from a plurality of vendors and sources. Maintenance, upgrade, and replacement of computer network components may result in the damage, loss, alteration, and relocation within the file directories of one or more software installations and related files.

SUMMARY

In an embodiment, a vendor software file inventory device is disclosed. The vendor software file inventory device comprises a server system comprising a plurality of file directories containing vendor software files, a processor, and a memory having an application stored thereon for execution by the processor. The application when executed by the processor initiates a first scan at the file directory level of the server system, to identify file directories containing information that will impede the file discovery scan and reduce the hosting performance if scanned, exclude the identified file directories from scanning, leaving the non-excluded file directories available, and initiates a second scan. The second scan is conducted at the software file level of the server system, to analyze the software files stored in non-excluded file directories to locate the files having a first parameter, identify the candidate files having the first parameter, analyze the candidate files for data according to a second parameter that identifies the vendor software file, and stores in the memory the vendor software file location.

In another embodiment, a method for discovering files on a server system is disclosed. The method for discovering files on a server system comprises the steps of scanning a file directory on a server system, identifying at least one file directory installed on a server system that contains files detrimental to the system's performance, excluding the at least one identified directory from further analysis to form a group of remaining directories. Subsequently scanning the group of remaining directories to discover files by locating candidate files that are sufficiently similar to a first parameter, verifying the candidate files according to a second parameter, and outputting the discovered files location.

In an embodiment, a method for managing files on a server system is disclosed. The method for managing files on a server system comprises the steps of scanning a file directory on a server system by identifying at least one file directory installed on a server system that contains files detrimental to the system's performance excluding the at least containing files detrimental to the system's performance, excluding the identified directory from further analysis to form a group of remaining directories, analyzing the excluded files for faults, scanning the group of remaining directories to discover files by locating candidate files that are sufficiently similar to a first parameter, verifying the candidate files according to a second parameter to identify the discovered files, and providing the discovered files to an output. The method for managing the files also comprises analyzing the files excluded by the first parameter and the second parameter according to a third parameter to determine a related files group, obtaining an analysis of software files related to the discovered files, and compiling the discovered files, the related files group, and the related software to manage the related files on a server.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
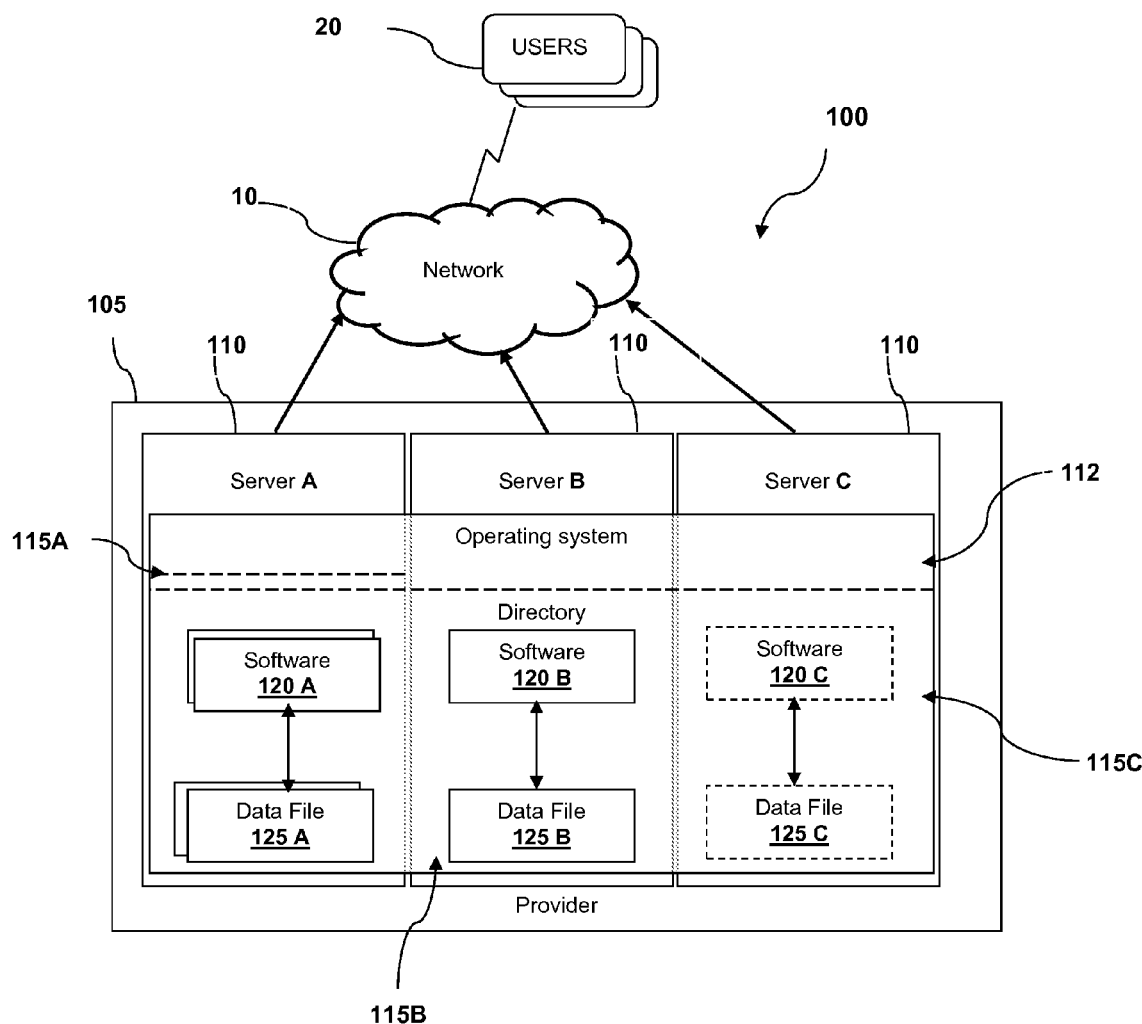
FIG. 1 illustrates an exemplary server system.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Broadly, computer and communications networks comprise a series of computers, servers, and other hardware configured for continuous execution of a range of functions to facilitate transmitting data among users. A portion of the computers, servers, and other hardware is maintained by hardware operators or service providers, hereinafter providers, who permit user access and data transmission across the network in exchange for fees or payment. These networks are designed for the modular installation and removal of hardware, such as servers, with minimal consequence to the server system performance and the exchange of data. The server operating system and any software installations are likewise configured for modular expansion, during operation while delivering at least a minimum level of performance to users. Currently, many server operating systems are preferably UNIX™ or Linux operating systems, with a minority of servers utilizing other operating systems (e.g. Microsoft Windows©). Server operating systems may be considered the architecture or environment for storing, accessing, and executing by computer processor various software programs. In certain configurations a UNIX™ or Linux server operating system may be considered a hierarchical database, hereinafter a system directory, which organizes and stores the computer processor-executable software, for example from a third-party or a vendor, for server operation in multiple layers of files, hereinafter file directories. In some configurations, the system directory may include registry files, configuration files, and storage files. Generally, registry files contain the server hardware settings, configuration files contain the initial settings for the software execution, and storage files contain data. Also, software execution for server operation may result in changes to the software files that are stored in various file directories, including changing a file location or relabeling the filename within the file directory. Hardware and firmware maintenance may require the relocation of file directories comprising the vendor software, including installation on other servers. Thus, over time the file directory and the software files stored therein may become separated across multiple, related file directories and multiple servers.

For example, identifying the file directory and software files locations on a server system and any changes therein provides an operator with an inventory of the files. The identification and location of registry files, configuration files, and storage files within the system directory permits an operator to identify, locate, and track access to the files or operation of the server system. Additionally, forming an inventory provides the operator a means to identify files that are installed on the server system and identify the files that are accessed frequently. Further, the inventory provides the operator a method to potentially identify missing, corrupted, or moved files.

For example, the inability to find a software file within a related file directory may represent a liability to the provider, for example when the subject software file may be a software license. Software vendors require proof of authorization to use their products, hereinafter a software license, and sometimes that software license may be stored in the file directory. Additionally, the vendors may request that the server operator audit the software licenses to verify that all the installations are licensed, for example every instance of the subject software product which may be installed on a plurality of different servers. Purchasing surplus licenses is an unfavorable expense for a provider, but unlicensed software installations may result in the provider owing the vendor a penalty. Therefore it is advantageous to be able to discover the location of moved or comprised licenses. However, file directory searches comprise a single pass, directory by directory, file by file, exhaustive analysis for locating a parameter indicative of the missing file, file of interest, or hereinafter, the searched file, within both the system directory and the file directory. Thus, locating, and confirming a license exists in the file directory may require excessive server resource reallocation, negatively impacting network performance, and incurring additional revenue loss. The present disclosure teaches a method for discovering, inventorying, and managing the location of the software files, including licenses, across the system and file directories of a server system.

For example, the inability to find a software file for the operation of various server applications, databases, document control, invoice control, and other internal business operations may represent a liability to an entity or a provider in the loss of efficiency and downtime for that particular process. In some examples the software file may be comprised or moved to an incorrect directory and as such is lost to the software program attempting to access and utilize it. In other examples, the loss of a file associated with a software program may inhibit the operation of that program. Alternatively, the loss of a stored file for a software program may represent the loss of information pertinent to clients, transactions, communications, marketing, and other business operations. In further examples, the lost files represent a liability to the provider or entity that owns and operates a server or server system in that an outside party or additional outside software may be purchased or utilized to recover the file. As may be understood, searching for a file may be resource intensive and inhibit the continued operations of a server or server system.

For example, the server executes a plurality of low-priority, high-throughput scans configured to exclude file directories from future searching, thereby decreasing the number of file directories and files that need to be scanned in subsequent steps in order to identify the searched file's location. In further examples, each scan proceeds down the hierarchy of file directories to individual files, as a "drill-down" type analysis. For example, a "drill-down" analysis may have a first scan of operating system directories, a second scan of the file directories within the operating system directories, a third scan of the files within the file directories, a fourth scan of the information within the files, and continuing until the file of interest is discovered. Alternatively, the server may execute a first scan of a directory, to identify and locate directories containing files that do not require analysis.

These directories and files are excluded prior to the server executing a second scan. In other examples, the server may be searching for parameters or properties of the searched file, rather than the specific file itself. The parameters may be a predetermined property, like file size or file name components, or the parameter may be a characteristic inherent to the searched file, such as specific text or data contained therein. In other examples, the server may analyze the files by the parameters in order to relate or connect them to respective software installations and software vendors. Further, the server may track the inventory of the files to the inventory of the respective software installations. Thus, an inventory and file to software management database is built and maintained by a series of exclusionary scans, that may be operated as low-priority, high-throughput in order to maintain server network performance In another example, during a first scan the server identifies a first file directory that contains instructions to access a second file directory, hereinafter a symbolic link, a soft link, or a link. If the second directory contains a link back to the first directory, the server identifies the first and second directories as containing a loop or closed loop. Further, if the second directory contains a link to a third, fourth, or additional sequential directories, the server identifies the first, second, and additional directories as containing an open loop or linear linkage. When the first, second, and potentially subsequent directories are identified, the server excludes these file directories from a list or recording of file directories requiring additional analysis.

Alternatively, when the server identifies file directories that are not related to the vendor of the software installation or have not been active in predetermined period, the server excludes these file directories from those requiring additional analysis. For example, the server analyzes the files contained in the non-excluded directories for information related to a predetermined, provider-determined, or vendor-provided file property, such as the filename, the file size, the file activity, other properties, or any combination of one or more of these properties. When the server identifies a file containing the file property, the server generates a script or stores a temporary file in the memory, the script or temporary file having the location of the file and the location of a respective software installation within the directory. Alternatively, when the server identifies a file containing a file property that does not have a respective software installation, the server records or stores the location of that file within the directory. In additional alternate examples, when the server identifies a software installation that does not have a respective file containing the predetermined property, the server records the location of that software installation in the directory.

Referring now to FIG. 1, a network system 100 is described. In one configuration, the provider 105 is the entity or infrastructure to host and support a network 10 for user 20 access. The provider 105 may be an individual, a group, an entity, or a corporation providing and comprising the hardware for the sharing and transmission of resources, information, and data. The provider 105 may operate a server 110 or plurality of servers 110 A, B, C dedicated to running one or more network services as a host. Each server 110 A, B, C may be considered an assemblage of hardware components, comprising any microprocessor, storage, and wherein the storage contains executable instructions for operation. Further, each server 110 A, B, C is operable via operating system 112 and directory 115 comprising hierarchical database of software 120 maintained on the storage component. The servers 110 A, B, C may be operable by a shared operating system 112 and directory 115 or by discrete operating systems 112 A, B, C, and directories 115 A, B, C, respectively. Broadly, the directory 115 contains the microprocessor executable instructions for the operating system 112 control of the server 110 as network host. Also, the directory 115 permits the provider 105 to incorporate software 120 as part of operating system 112. The software 120 may be maintained on the storage component of the servers 110 and contain microprocessor-executable instructions, accessible via the directory 115. In further examples, a file 125 containing information relevant to and accessible by the software 120 may be stored in the directory 115. Thus, servers 110 A, B, C, are operable to provide a network 10 and other computing services for users 20 via execution of the software 120 accessible via the directory 115 and controllable by the operating system 112.

The system 100 comprises a provider 105 having any number of servers 110 providing or supporting any number of networks 10. Configurations including a plurality of servers 110 A, B, C, may be understood to be in communication via the network 10, or by any other electronic communication method, such as but not limited to a local area network (LAN) or intranet, operated by provider 105. Any software 120 and files 125 may be incorporated into the directory 115 and stored on none of—or any number of—a plurality of servers 110 A, B, C. Optionally, one of the servers 110 may not have software 120 or a file 125 stored thereon, as illustrated herein by dashed lines in server 110 C. Alternatively, any server 110A may have a plurality of directories 115, and plurality of software 120A and file 125A installations in the directory 115, as illustrated herein by the shadowed directory 115A, software 120A, and file 125A, on server 110 A.

While there are many suitable operating systems for the present disclosure, as used herein operating system 112 generally refers to operating systems based on a hierarchical database that comprises the directory 115. For example, the directory 115 is configurable for organizing the accessibility of the microprocessor-executable instructions in the software 120 for the operating system 112 mediated, automated control of the servers 110. In additional examples, the directory 115 is configurable to include graduated permissions for microprocessor access to files 125 in association with or for access to software 120. The provider 105 may determine or configure the graduated permissions of the directory 115 for the software 120 and files 125. For example, such that the directory 115 permits differential access to software 120 and files 125 as during the operations of the server 110. In another example, the execution or the completion of the instructions from software 120A by server 110A subsequently enables the server 110B to access the software 120B in order to provide or support network 10. Additionally, access for personnel, operators, or technicians of the provider 105 as users 20, may be graduated similarly. Without limitation, controlling the access to the system 100 minimizes risks, damage, degraded performance, or downtime via accidental corruption of the directory 115, software 120, files 125, or the operating system 112. Further, the operating system 112 is generally configured as a stable, high through-put, stable platform containing a similarly stable directory 115. In non-limiting examples, the operating system 112 comprises a UNIX™ or Linux operating system, or comparable.

Generally, the software 120 comprises a vendor supplied software program, containing microprocessor-executable instructions to transform the server 110, or the operations thereof, in order to host a network 10. Depending on the vendor services and the computing service of the provider 105, in response to the software 120 the server 110 may function as a database server, a file server, a mail or electronic-mail server, a print server, a web or Internet server, a gaming server, a telecommunications server, a billing or invoice server, a customer access server, a marketing server, an internal messaging server, a document control server, or any other server that may be associated with a business, without limitations. Upon execution of the software 120, the server 110 provides, shares, or otherwise conducts a portion of the computational tasks on behalf of the users 20 via the network 10.

Turning now to the file 125, the searched file or file 125 comprises any data or information relevant to or as a component of the software 120, accessible via the directory 115 on any server 110. For example, the file 125 may comprise an electronic version of the end-user agreement or software license. Generally, a software license represents the contractual agreement between the vendor and the provider 105 for the use of the software 120 in the system 100. For example, the software license may establish the provider's 105 permissions to copy or redistribute the software 120, across co-owned servers 110, operating systems 112, directories 115, or in some instances to third parties. Additionally, the software license establishes the penalties that the provider 105 owes the vendor for unauthorized or unlicensed copying and use of the software installation 120.

Alternatively, the file 125 may comprise an executable file or a data file. In instances, an exemplary executable file may comprise an instruction to access another portion of the server or other files. For example, an executable file may be an instruction to access a database, send messages to employees or customers, or generate a report or analysis, without limitation. Also, in exemplary configurations a data file may comprise stored information relevant to the operation of the software. Non-limiting exemplary data files may include an algorithm for invoicing clients and customers, permitting secure customer access to accounts, and permitting secure connections between other entities both internal and external to the provider's 105 business ventures.

Figure 2:
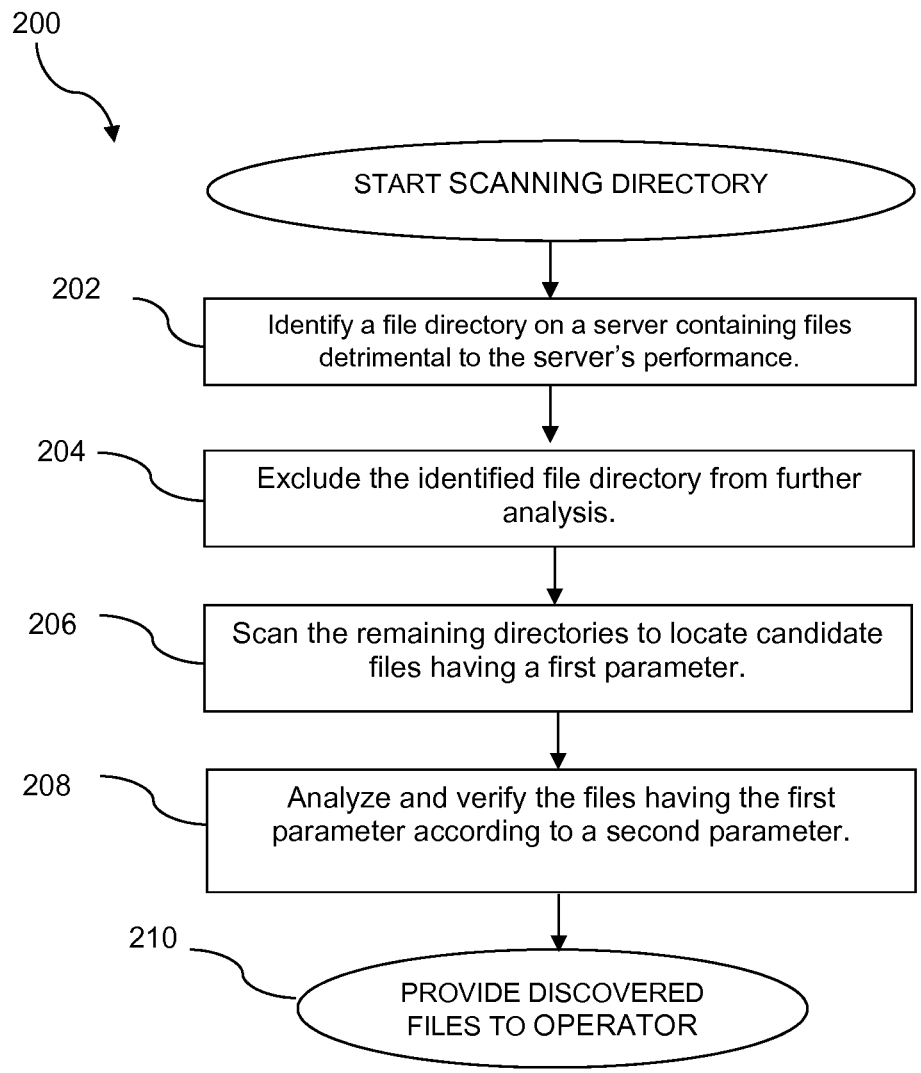
FIG. 2 illustrates an exemplary file discovery method.

Referring now to FIG. 2, and in view of FIG. 1, there is a method 200 described for discovering a file 125 location in directory 115. As discussed hereinabove, due to the operation of the server 110, software 120 including files 125 and the electronic links thereto, may be relocated. Alternatively, operational faults, electric interference, power surges and, hardware component maintenance, failure, and replacement, may all contribute to severing electronic links or distorting the electronic organization of software 120 and files 125 in directory 115. Thus, a file 125 for example, may no longer be accessible according to the original electronic path in the directory. Thus, the present method 200 is configured to discover the new electronic location of a file, regardless whether it is a discrete file 125 or a file integral to the operation of software 120, within the directory 115.

Generally, the method 200 includes an identification block 202, an exclusion block 204, a candidate block 206, and a discovery block 208. Additionally, the method 200 comprises an output block 210 for providing an operator the discovered files and information related to the discovered files. For example, the identification block 202 may be considered a high-level or preliminary scan of the directory 115. The identification block 202 comprises identifying file directories in the directory 115 containing files or commands that would create a server 110 resource conflict and have negative performance implications for the users 20 of the network 10. For example, the method 200 includes an exclusion block 204 for separating the file directories into non-excluded file directories that continue according to method 200, and the excluded file directories that cease further analysis according to the method 200. In one configuration, the exclusion block 204 notes the locations of the excluded file directories, for example in a script or other storage means which may be temporary, transitory, or volatile. In another example, the candidate block 206 initiates a scan of the files in the non-excluded file directories. More specifically, the candidate block 206 identifies candidate files that are similar to or do not directly match a first predetermined or provided property or parameter. Files that are not sufficiently similar to—or directly match—the first parameter are excluded from further analysis according to the method 200. Additionally, the file directory location of the candidate files may be stored in a script or other temporary storage as discussed, previously. Alternatively, the file directory location of the candidate files may be stored in a non-transitory form, for example on the memory of the server 110. Once the candidate files and their file directory location are identified, the discovery block 208 analyzes the candidate files according to a second parameter. Without limitation by theory, the second parameter is highly specific or directly correlated to the original file. In certain examples, the second parameter is highly conserved with, if not exclusive to an original parameter of the now inaccessible file. The output block 210 provides the location of the discovered files to an operator. Also, the output block 210 is configured for providing information and related files to an operator. For example, by saving them to the memory and creating a new directory for them. Additionally, for example the method 200 may be expanded to multiple servers 110 by parallel, sequential, or asynchronous processing without limitation.

Referring now to FIG. 2 exclusively, illustrating the method 200, the identification block 202, includes the initiate step of scanning the system directory and the file directories. Generally, the identification block 202 is scanning the directories to identify file directories that potentially will negatively affect the allocation of the server resources between the method 200 and supporting the network (e.g. 10, in FIG. 1). For example, as the method 200 proceeds from directories into files, there will be an increase in the number of places that require scanning. More specifically, there are many more files than there are directories and that will utilize or consume additional server resources, exclusive of anything contained in the files. Additional server resources may include processor power, processor speed, processor proportion, and other hardware resources without limitation, that are removed from the operation of the network to conduct the scan. Thus, the identification block 202 is rapidly scanning or skimming the file directories for certain indicators, without addressing substantive information contained therein. For example, the identification block 202 is scanning the file directory for indicators such as the vendor; file continuity, integrity, quantity or volume, size, type, and frequency of appearance in each file directory; the frequency of access, and the location within a larger directory. In other examples, the identification block 202 is scanning the file directories for highly transitory data storage or frequent utilization. Alternatively, the identification block is scanning the directories to identify file directories that contain a command to access another file or file directory. Further, the identification block 202 may be scanning and checking the file directories against a list or database of "unrelated" or "pre-excluded" file directories from the provider or the vendor. In general, it may be understood that the identification block 202 is a method of scanning a database that is configured to recognize any data properties within a file directory that exceed a predetermined acceptable level for further analysis herein.

For example, there are certain conserved portions of most server operating systems and particularly, UNIX™ or Linux operating systems that are stored in the registry files, configuration files, and operational information storage files and found within specific directories. These files may contain an excessive volume of data or excessively transitory data, when related only to underpinning the general operation of a server system. In one example, UNIX™ or Linux registry files /bin, /sbin, and /boot contain the software commands needed to boot up the server hardware; revise and maintain the directory system; and create a temporary, virtual file-system in the volatile memory, in preparation for operating the server in communication with the network. Likewise, the configuration files in the directory such as the /dev, /etc, and /proc contain the transitory device-only files and scripts for the system, users, and provider/operator; hardware—operating and system-specific configuration files; records of access and operation; and devices drivers for the aforementioned temporary, virtual-file system. In additional detail, the /etc/sysconf and /etc/skel may contain a large volume of information specific to UNIX™ or Linux as server operating systems. Finally, portions of the /var directory are used to track users as they access, utilize, and share data via the network. Further, "drill-down" analysis through these file directories and files represents a potential misallocation of the hardware resources as described, because these directories relate to the operating system and rarely include consumer purchased or installed software. Further, the potential volume of data at the individual file level and the transitory nature of portions of it, are likely to consume additional server hardware resources and potentially degrade the performance of the network, creating user conflicts and lost revenue. Thus, identification block 202 would identify these file directories as potentially resource intensive to analyze further.

In another example of identification block 202, the processing of block 202 identifies the file directories derived from a vendor's software that are unrelated to the searched file. For example, a software vendor may provide a list of the specific directories, configurations, storage, and other files their software installs on the server, accessible through the directories. Additionally, the vendor of the unrelated software may demonstrate that the permissions to access the associated file directories would prevent or preclude the searched file from relocating in those directories. Optionally, the unrelated software may be "pre-excluded" as described above, such that the identification block 202 identifies the file directory and carries the exclusion forward. In other examples, the identification block 202 has to identify the unrelated file directories, based on another parameter, such as the format or the naming construction of the file directory. In alternative examples, the identification block 202 may separately identify the unrelated directories regardless of a provided directory list or pre-exclusion. The examples herein lay out the conditions by which a search of the unrelated directories and files is unnecessary, and thus a misappropriation of the server hardware resources. Thus, the identification block 202 may identify these unrelated directories as such.

The identification block 202 identifies a file directory that is linked or contains linked files. In instances, a first file directory includes commands, references, or links to a second file directory which may be considered a soft-link or a symbolic link. In some examples, the second directory includes commands, references, or links to return to the first file directory, and the return link path from the second directory to the first directory may be mediated by a file in a third directory, or any additional number of intermediate files and directories. Thus, the symbolic linking between a plurality of directories that returns to the first directory, may be considered circular-, closed-, or tight-loop linking. Attempting to analyze the tight-loop linking directories according to the present method is likely to result in repeated scanning or re-analyzing the linked file directories to no purpose. Alternatively, absent this identification, the tight-loop analysis will re-discover the searched file on each subsequent loop, thereby generating redundant temporary storage files or scripts, and further obfuscating the number and location of the searched file. Further, as the tight loop linked file directories do not contain termination instructions, the looping will continue to utilize server hardware resources and degrade the server system performance. Thus, the identification block 202, identifies linked and particularly, tight-looped file directories, for exclusion from subsequent steps of the method.

In further instances, a first file directory includes commands, references, or links to a second file directory that may likewise be considered a soft-link or a symbolic link. In some examples, the second directory includes commands, references, or links to a third file directory. The link path from the first directory to the third directory may be mediated by a file in a fourth directory, or any additional number of intermediate files and directories. Thus, the symbolic linking between multiple directories that increasingly incorporates additional scanned directories may be considered open or linear linking. Attempting to analyze the open linked directories is likely to result in expansive file incorporation and increased file search scope. Further, unless open linked file directories contain termination instructions, the search will continue to utilize server hardware resources, expand the number of directories searched, and degrade the server system performance. Thus, the identification block 202, identifies open-linked file directories, for exclusion from subsequent steps of the method.

Generally, the exclusion block 204 collects and utilizes the scripts and temporary files generated by the identification block 202 in order to separate the directories into excluded file directories and non-excluded directories. In certain instances, the exclusion block temporarily or virtually, forms a supra-directory, containing an excluded file directory, comprising references or links to the identified directories, and a non-excluded file directory, comprising references of links to the remaining directories. However, the excluded supra-file directory is inaccessible by the method 202, and steps beyond the exclusion block 204, including the "drill-down" analysis. In alternate examples, the exclusion block 204 may alter the access permissions to prevent the software of method 200 from accessing an identified directory. Also, the exclusion block 204 may generate temporary files or scripts that provide executable instructions for skipping or bypassing the identified directories during the later steps of the method 400. In some examples, the exclusion block 204 may create a non-transitory database of the identified file directories, wherein the database may be stored and reused in future file discovery processes such as method 200. Also, the database of identified and excluded directories may be accessible by personnel, operators, or technicians of a server operator/provider. Without limitation by theory, utilizing the database of identified directories reduces the time and server hardware resources in the discovery of future files, for example via additional applications of method 200. The creation of the non-transitory database may be considered the initial step in assembling an inventory of software, file directories, and files on a server. As such, the exclusion block 204 aids in the method 200 by removing the identified file directories access and analysis, such that only the non-excluded file directories may be subjected to the subsequent analysis steps.

The candidate block 206 analyzes the non-excluded file directories according to a parameter of the searched file of interest. The parameter that is being analyzed may be considered a predetermined parameter or an operator (e.g. the provider) determined parameter. The candidate block 206 analyzes the individual files within the non-excluded file directories based on a known or conserved parameter among files provided by the vendor, among files having similar contents, or among similar file types. As such, the parameter may include the filename, the file size, the date of installation of upload of the file to the server, other general installation properties, a combination of these factors, or by any operator determined factor, without limitation. For example, to minimize the server hardware resource usage, candidate files and the directories they are analyzed by searching and comparing filenames or file sizes. Generally, a vendor's file naming conventions and arrangements are unique to their products. Thus, the candidate block 206 searches for similarly named files in the non-excluded directories. Alternatively, certain file-types (e.g. software licenses) have highly conserved file sizes, which permits efficient searching and analysis within a narrow range of file sizes in the non-excluded directories. As is understood, in some cases the searched file may have been damaged, corrupted, or otherwise changed. In optional examples, the candidate block 206 may identify files that have similar parameters within a predetermined range or within an operator determined range. Candidate block 206 may search, analyze, and identify files that have a minimum percentage of similarity to the search parameter. For example, utilizing the filename the candidate block 206 analyzes and identifies the candidate files that have a percentage of the same alpha-numeric characters in the same order as the parameter. Alternatively, utilizing the file size the candidate block 206 analyzes and identifies the candidate files that fall within a range above and below the parameter. More generally, the candidate block 206 is operable to search, analyze, and identify all files in the non-excluded directories that are at least 50% the same as the search parameter; alternatively at least 70% the same as the search parameter; and in certain instances at least 90% the same as the search parameter. As understood and described herein, the lower the percent similarity, the higher number of files the candidate block 206 will analyze and identify, and there will be a higher demand for server hardware resources. In some instances, an operator may instruct the candidate block 206 to search for files that have greater than 95% similarity to the search parameter. Broadly, the candidate block 206 analyzing and identifying potential candidate files is configured to narrow the number of files to a significantly small number compared to the number of files and directories present in the operating system and file directories.

During the analysis when the candidate file is identified, the candidate block 206 saves the candidate files' locations. The candidate block 206 may create a script or store a file on the memory, and in some examples the script or file may contain a link to the file. By saving the candidate files' locations, the candidate block 206 essentially excludes all other files from additional analysis of the candidate files. Additionally, by excluding all other files and preserving the candidate files' locations as a file in the memory, the candidate block 206 may create a database of the locations of the candidate files. In alternative examples, the candidate block 206 may access and alter the file stored on the memory by the exclusion block 204. The candidate file database may be accessible by personnel, operators, or technicians of an enterprise, such as the provider 105. Thus, without limitation by theory, the candidate file database provides an inventory or at least the preliminary information to create an inventory of files related to the parameter.

After the candidate phrases have been identified and their locations stored by the candidate block 206, the discovery block 208 analyzes the candidate files to discover, or determine which, if any, is the searched file of interest based on a second set of parameters. The discovery block 208 may be operable similar to the candidate block 206, however the second set of parameters are highly specific to the searched file. Exemplary parameters include specific text within the file, specific text within the file's meta-data, lines of code present in the file itself, electronic watermarks, and vendor or operator determined parameters. The second set of parameters may be used by the discovery block 208 to discover information about the file's authenticity, validity, or source. For example, if the searched file relates to a software license, the discovery block 208 is configured to analyze and verify that the file includes a license number, that the license number is associated with a software vendor, a software program, a program release number, a program release number, an installation date, an expiration date, or any combination thereof.

After the candidate files are analyzed by discovery block 208, the discovered files and data collected may be compiled by output block 210. The output block 210 generally provides the operator a number of discovered files, the locations of the discovered files, and the relatedness of the discovered files to the second parameter, and the information from the discovered file. The output block 210 is configurable to reinitiate the present method 200 to verify the discovered files, discover related files, discover other files, determine the software installations related to the discovered files, and determine the validity of the discovered files. For example, the output block 210 may reinitiate a search according to the present method 200 to discover software or other files related to the discovered files. Also, the output block 210 may include determining the number of discovered files compared to the number of software installations. In some examples, the output block 210 comprises relocating the discovered files, saving them to a memory, and creating a new file directory or link to the discovered files. Further, when the discovery block 208 results in the exclusion of one or more files having significant similarity in the first parameter but not the second parameter, or the exclusion of one or more files having significant similarity in the second parameter, the output block 210 is configurable to create and store on a memory a file having information indicative of the location of those files. In other examples, the highly related but excluded files are relocated, saved on the memory, and associated with the discovered files to facilitate analysis and inventorying.

Figure 3:
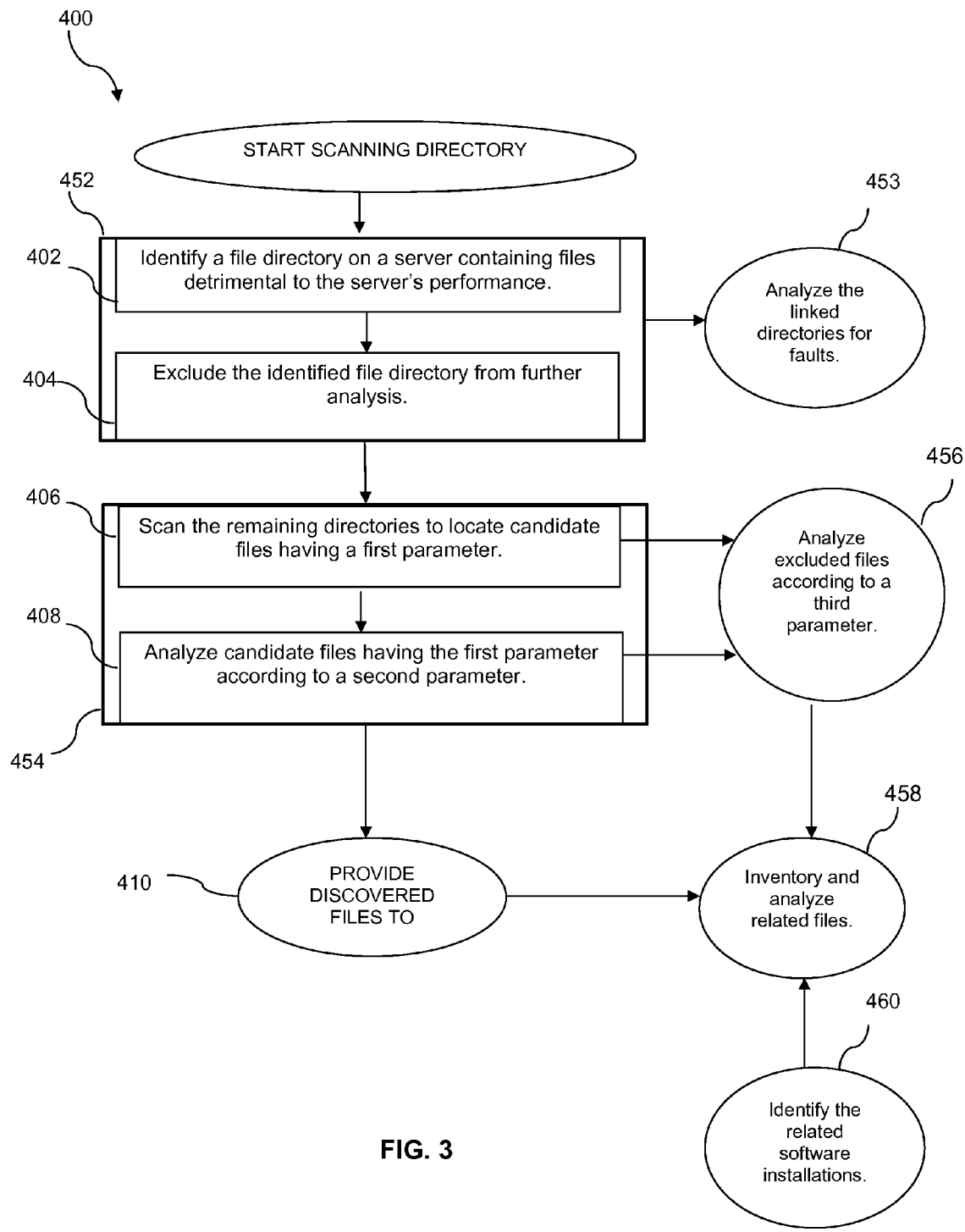
FIG. 3 illustrates an exemplary file discovery and management method.

Referring now to FIG. 3, there is illustrated a file discovery and management method 400 that is comparable to the method illustrated in FIG. 2 and described hereinabove. More specifically, the method 400 comprises a comparable identification block 402, exclusion block 404, candidate block 406, discovery block 408 and output block 410. In the present method, the identification block 402 and the exclusion block 404 are part of the directory block 452. The directory block 452 is configured as an asynchronous preliminary scan of the file directory. As in the method 200 above, the directory block 452 includes the identification block 402 for identifying file directories containing files or commands that would create a server resource conflict and have negative performance implications. Likewise, the directory block 452 comprises a comparable exclusion block 404 for separating the file directories into non-excluded file directories. In the present method, the directory block 452 includes a linked output 453 for providing an operator the location of the linked or tight-looped file directories. The linked output 453 may also be configured to temporarily disable the symbolic linking, in order to conduct the preliminary scan. The linked output 453 provides a file management function to the discovery scanning process and may be utilized to prevent the server hardware resource conflicts resultant from entering the tight-loop. Also, the linked output 453 provides a means to identify, locate, and address symbolic links prior to the creation of a server hardware resource conflict. In certain instances, the linked output 453 is stored on a memory, until it is reviewed by an operator for confirmation that the file directories and files therein do not have a fault or issue that may result in the corruption of software or related files.

The file discovery and management method 400 also comprises a file analysis block 454 comprising a candidate block 406 and a discovery block 408. The file analysis block 454 is configured for asynchronous analysis of the files in the non-excluded file directories from the directory block 452. As described previously with respect to the file discovery method 200, the candidate block 406 identifies candidate files that are similar to or directly match a first parameter. The files that are not sufficiently similar to or directly match the first parameter are excluded from further analysis to leave candidate files for analysis in the discovery block 408. Also as described previously, the discovery block 208 analyzes the candidate files according to a second parameter that is highly specific or directly correlated to the original file. In certain examples, the second parameter is highly conserved with, if not exclusive to, an original parameter of the now inaccessible file. The discovered files are directed to the output block 410 as previously described.

In the configuration of the file discovery and management method 400 herein, the file analysis block 454 is providing the excluded file information from the candidate block 406 and the discovery block 408 to an excluded candidate files block 456 for analysis. The excluded candidate files block 456 comprises an additional step of analysis to determine if there are additional related files to the first and second parameters and the discovered files that were not identified. The excluded candidate files block 456 conducts another asynchronous scan of the files excluded from the file analysis block 454, and in certain examples utilizes a third parameter to determine if there are additional files related to the discovered file. When, the excluded candidate files block 456 determines there are additional related files, they are provided to a related files inventory and analysis block 458.

The inventory and analysis block 458 is a method to inventory or count, and analyze related files from various process blocks in the file discovery and management system 400. For example, the output block 410 provides the discovered files or information regarding the discovered file to the related files inventory and analysis block 458. Additionally, a software block 460 analyzes the number of software installations, and a file related to the discovered file and provides that information or those files to the inventory and analysis block 458. The inventory and analysis block 458 compiles, analyzes and provides the operator information regarding the number of files that are related by the first, second, and third parameter. Additionally, the inventory and analysis block 458 serves to determine the software associated with the related files, such that the software or the vendor may be addressed. Further, the file discovery and management method 400, including the linked output 453, the excluded candidate files block 456 and the inventory and analysis block 458 may be expanded to multiple servers by parallel, sequential, or asynchronous processing without limitation.

Figure 4:
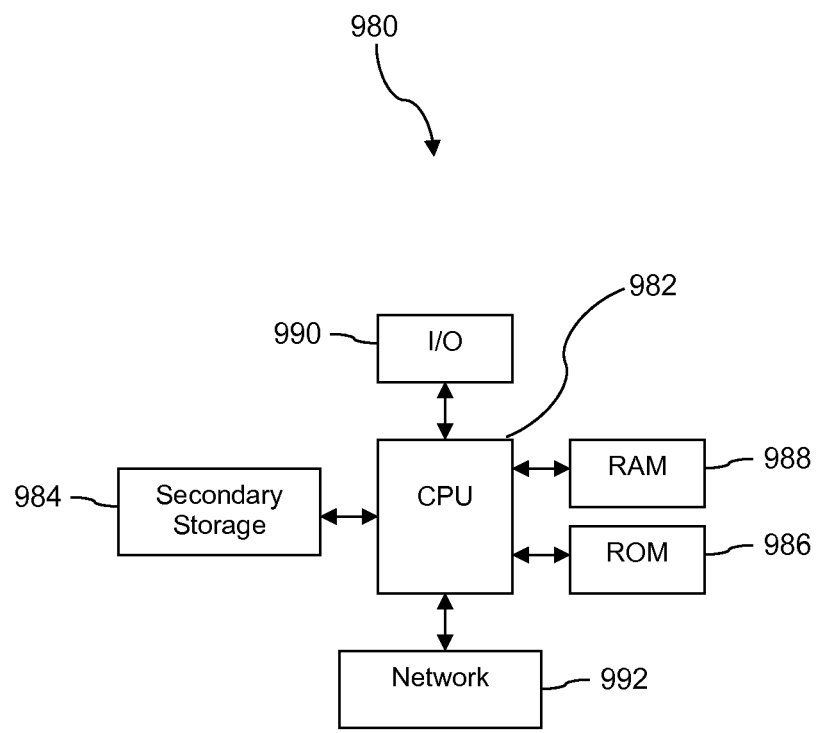
FIG. 4 illustrates an exemplary server-based computer system suitable for implementing the several embodiments of the disclosure.

FIG. 4 illustrates a server-based computer system 980 suitable for implementing one or more embodiments disclosed herein. The server-based computer system 980 includes a processor 982, which may be referred to as a central processor unit, a computer processor unit, or a CPU. The processor 982 at is in communication with memory devices including secondary storage 984, read only memory (ROM) 986, random access memory (RAM) 988, input/output (I/O) devices 990, and network connectivity devices 992. The processor 982 may be implemented as one or more central processor units or chips.

It is understood that by programming and/or loading executable instructions, for instance from the directory disclosed hereinabove, onto the computer system 980, at least one of the central processing unit 982, the random access memory 988, and the read only memory 986 are changed, transforming the computer system 980 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 984 is typically comprised of one or more disk drives or tape drives and is used for non-volatile storage of data and as an over-flow data storage device if random access memory 988 is not large enough to hold all working data. Secondary storage 984 may be used to store programs which are loaded into random access memory 988 when such programs are selected for execution. The read only memory 986 is used to store instructions and perhaps data which are read during program execution. Read only memory 986 is a non-volatile memory device which typically has a small memory capacity relative to the larger memory capacity of secondary storage 984. The random access memory 988 is used to store volatile data and perhaps to store instructions. Access to both read only memory 986 and random access memory 988 is typically faster than to secondary storage 984. The secondary storage 984, the random access memory 988, and/or the read only memory 986 may be referred to in some contexts as computer readable storage media and/or non-transitory computer readable media.

Input/output devices 990 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 992 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 992 may enable the server-based processor 982 to communicate with the Internet, one or more intranets, and one or more users. With such a network connection, it is contemplated that the server-based processor 982 might receive information from the network, or might output information to the network in the course of performing the above-described method steps. Such information, which is often represented as a sequence of instructions to be executed using server-based processor 982, may be received from and outputted to the network, for example, in the form of a computer data signal embodied in a carrier wave.

Such information, which may include data or instructions to be executed using server-based processor 982 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The server-based processor 982 executes instructions, codes, computer programs, scripts which it accesses from hard disk, floppy disk, optical disk, such that these various disk based systems may all be considered secondary storage 984, or read only memory 986, random access memory 988, or the network connectivity devices 992. While only one server-based processor 982 is shown, multiple server-based processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 984, for example, hard drives, floppy disks, optical disks, and/or other device, the read only memory 986, and/or the random access memory 988 may be referred to in some contexts as non-transitory instructions and/or non-transitory information.

In an embodiment, the server-based computer system 980 may comprise two or more computers or servers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers or servers. In an embodiment, virtualization software may be employed by the server-based computer system 980 to provide the functionality of a number of servers that is not directly bound to the number of computers in the server-based computer system 980. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the provider or another enterprise, as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the server-based computer system 980, at least portions of the contents of the computer program product to the secondary storage 984, to the read only memory 986, to the random access memory 988, and/or to other non-volatile memory and volatile memory of the server-based computer system 980 disclosed herein. The processor 982 may process the executable instructions and/or data structures in part by directly accessing the computer program product, for example by reading from a compact disk-read only memory disk (CD-ROM disk) inserted into a disk drive peripheral of the server-based computer system 980. Alternatively, the processor 982 may process the executable instructions and/or data structures by remotely accessing the computer program product, for example by downloading the executable instructions and/or data structures from a remote server through the network connectivity devices 992. The computer program product may comprise instructions that promote the loading and/or copying of data, data structures, files, and/or executable instructions to the secondary storage 984, to the read only memory 986, to the random access memory 988, and/or to other non-volatile memory and volatile memory of the server-based computer system 980.

In some contexts, the secondary storage 984, the read only memory (ROM) 986, and the random access memory (RAM) 988 may be referred to as a non-transitory computer readable medium or a computer readable storage media. A dynamic RAM embodiment of the RAM 988, likewise, may be referred to as a non-transitory computer readable medium in that while the dynamic RAM receives electrical power and is operated in accordance with its design, for example during a period of time during which the computer 980 is turned on and operational, the dynamic RAM stores information that is written to it. Similarly, the processor 982 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A vendor software file inventory device, comprising:
a server system configured as a host within a network, the server system comprising:
   a non-transitory memory storing a plurality of file directories, the file directories including vendor software files;
   at least one processor coupled to the non-transitory memory; and
   an application stored in the non-transitory memory that, upon execution configures the at least one processor to:
      initiate a first scan at a file directory level of the server system, wherein the first scan:
         identifies file directories containing looped or open links to one or more additional directories as identified file directories,
         excludes the identified file directories from scanning in a second scan, and
         based on exclusion of the identified file directories, leaves non-excluded file directories available,
      after the first scan, initiate the second scan at a software file level of the server system based on the first scan, wherein the second scan:
         analyzes the software files stored in non-excluded file directories to locate the files having a first parameter, identifies candidate files having the first parameter,
analyzes the candidate files for data according to a second parameter, and
based on the second parameter, identifies at least one vendor software file,
store, in the non-transitory memory, a location of the at least one vendor software file,
based on the first scan and second scan, create a file inventory of the server system used to manage the at least one vendor software file location, and
in response to a later request, identify a software license file using the file inventory.

2. The vendor software file discovery device of claim 1, wherein the at least one vendor software file is at least one of a software license file, an executable files, or a data files.

3. The vendor software file discovery device of claim 1, wherein the first scan further: identifies and excludes file directories having unrelated vendor software, inactive vender software, registry files, configuration files, and operational-information storage files.

4. The vendor software file discovery device of claim 1, wherein the first scan further: identifies and excludes linked directories, wherein the linked directories comprise looped or open links, and wherein the looped or open links comprise at least one of soft-links, symbolic links, closed-loop links, tight-links, or multiple linear links.

5. The vendor software file discovery device of claim 1, wherein the first scan further generates a script or stores a temporary file on the memory, the script or temporary file comprising the location of the excluded file directory and the reason for exclusion.

6. The vendor software file discovery device of claim 1, wherein the first parameter comprises at least one of a filename, a filesize, a date of installation on the server, text within the file, text within the file meta-data, lines of code present in the file itself or any combination thereof; and wherein the second parameter comprises vendor-specific file information.

7. The vendor software file discovery device of claim 1, wherein the second scan further:
converts at least one of a script or a temporary file to a permanent file; and
builds a database inventory of the locations of the excluded file directories and the candidate files.

8. A method for discovering files on a server system, comprising:
scanning, by the server system executing a scanning application configuring at least one processor, a file directory on a server system by:
identifying at least one file directory of a plurality of file directories, installed on a memory of the server system, that is not configurable to contain a candidate file,
excluding the at least one identified directory from further analysis, and based on excluding the at least one identified directory, forming a group of remaining file directories from the plurality of file directories;
scanning, by the server system executing the scanning application, the group of remaining file directories that discovers files by:
locating candidate files that are sufficiently similar to a first parameter,
based on the candidate files that are sufficiently similar to the first parameter, verifying the candidate files according to a second parameter, and
based on the verifying, discovering file locations of the candidate files;
outputting, by the server system, each location of the discovered file locations of the candidate files in a memory coupled to the server system; and
creating, by the server system, a file inventory of the server system that manages each location of the candidate files.

9. The method for discovering files on a server system of claim 8, wherein the candidate files are at least one of software license files, executable files, or data files.

10. The method for discovering files on a server system of claim 8, wherein scanning the file directory further comprises excluding directory files having unrelated vendor software, inactive vender software, registry files, configuration files, and operational information storage files.

11. The method for discovering files on a server system of claim 10, wherein the scanning the file directory further comprises identifying and excluding linked directories, wherein the links comprise at least one of soft-links, symbolic links, closed-loop links, tight-links, open links, or multiple linear links.

12. The method for discovering files on a server system of claim 8, wherein the first parameter comprises at least one of a filename, a filesize, a date of installation on the server, or any combination thereof.

13. The method for discovering files on a server system of claim 8, wherein the second parameter comprises at least one of vendor-specific file information, text within a file, text within a file meta-data, lines of code present in a file itself, or any combination thereof.

14. The method for discovering files on a server system of claim 8, wherein outputting the discovered file locations comprises generating a script or storing a file on the memory.

15. A method for managing files on a server system, comprising:
scanning, by a scanning application executing on at least one processor, a file directory on the server system by:
identifying at least one file directory installed on the server system that contains files detrimental to the system's performance,
excluding the at least one directory containing files detrimental to the server system's performance from further analysis, and
based on excluding the at least one directory, forming a group of remaining directories from the file directory;
analyzing, by server system, the at least one directory excluded from the group for faults;
scanning, by the server system, the group of remaining directories that discovers files by:
locating candidate files, wherein the candidate files are sufficiently similar to a first parameter, and
verifying the candidate files according to a second parameter to identify discovered files;
providing, by the server system, the discovered files to an output memory in response to scanning of the group;
determining, by the server system, a related files group from the discovered files based on the files excluded by the first parameter and the second parameter according to a third parameter;
obtaining an analysis of related software files responsive to determining the related files group from the discovered files;
compiling the discovered files, the related files group, and the related software files; and
creating, by the server system, a file inventory on at least one server that manages the compiled files.

16. The method for managing files on a server system of claim 15, wherein the discovered files are at least one of software license files, executable files, data files, or any combination thereof.

17. The method for managing files on a server system of claim 15, wherein scanning the file directory further comprises identifying and excluding linked directories, wherein the links comprise at least one of soft-links, symbolic links, closed-loop links, tight-links, open links, or multiple linear links; and wherein the excluded linked directories are analyzed for faults.

18. The method for managing files on a server system of claim 15, wherein the first parameter comprises at least one of a filename, a filesize, a date of installation on the server, or any combination thereof; and wherein the second parameter comprises at least one chosen from the group consisting of vendor-specific file information, text within the file, text within the file metadata, lines of code present in the file itself, and combinations thereof.

19. The method for managing files on a server system of claim 15, further comprising generating a script or storing a file on the memory.

20. The method for managing files on a server system of claim 15, further comprising managing the compiled files as an inventory on a server comprises forming taking an inventory of related files that correspond with at least one vendor software.

* * * * *